April 9, 1957   J. P. CARR   2,787,860
FISHING LURE
Filed Dec. 21, 1954
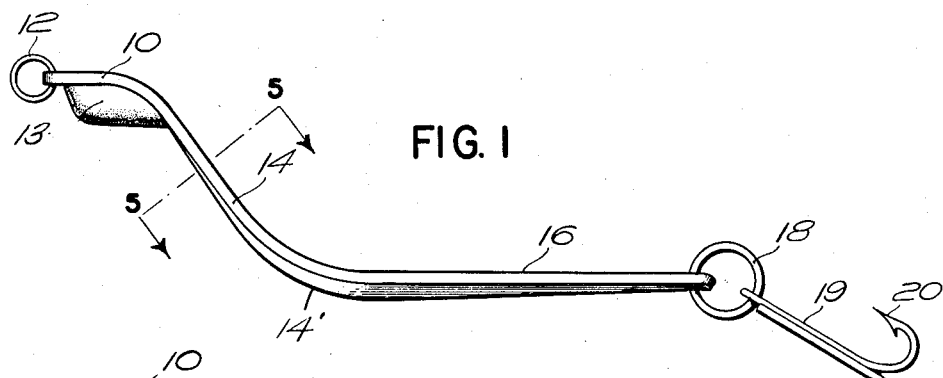
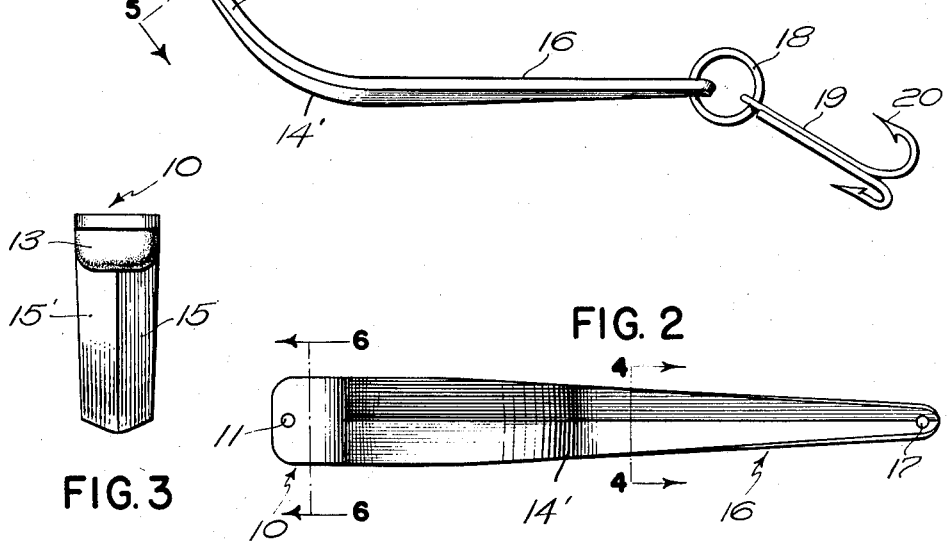
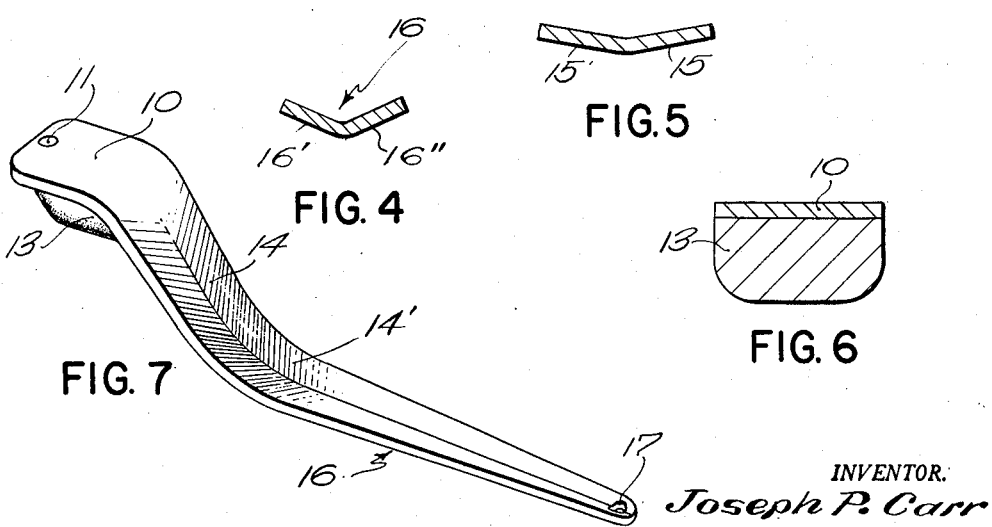
INVENTOR.
Joseph P. Carr
BY
Barlow & Barlow
ATTORNEYS United States Patent Office 2,787,860
Patented Apr. 9, 1957

2,787,860

FISHING LURE

Joseph P. Carr, North Attleboro, Mass., assignor to Evans Case Co., a corporation of Massachusetts Application December 21, 1954, Serial No. 476,630

4 Claims. (Cl. 43—42.39)

This invention relates to a fishing lure and more particularly to that type of lure generically known as a spoon.

In fishing lures of this general type they have generally assumed a shape including a concave surface to secure the desired wiggling action. However, for certain applications, this shape does not secure the proper results, and it is therefore one of the main objects of my invention to provide a lure which has a swimming action resembling that of a fish in which the lure will rock from side to side on an axis taken generally through the center of the longitudinal extent thereof.

Another object of my invention is to provide a lure which is provided with a slightly curved forward end and which is of elongated character, the forward edge of the lure presenting a generally V-shaped surface.

A still further object of the invention is to provide a lure that is simple in construction and will lend itself to economical manufacture as well as provide animation when operated submerged below the surface of the water to attract fish.

With these and other objects in view, the invention consists of certain novel features of construction as will be more fully described and particularly pointed out in the appended claims.

In the accompanying drawings:

Figure 1 is a side elevational view of a fish lure embodying the features of my invention;

Figure 2 is a top plan view thereof;

Figure 3 is a front view thereof;

Figure 4 is a sectional view taken on lines 4—4 of Figure 2, showing the configuration of the lure at the tail portion;

Figure 5 is a sectional view taken on lines 5—5 of Figure 1, showing the configuration of the line at the intermediate portion;

Figure 6 is a sectional view taken on lines 6—6 of Figure 2, showing the configuration of the line attaching portion; and Figure 7 is a perspective view of the lure taken from the rear quarter thereof.

Referring now more particularly to the drawings, 10 indicates a line attaching portion which is provided with a hole 11 centrally thereof through which a line attaching ring 12 may be affixed. The portion 10 may be provided with an auxiliary weight 13 so that the lure will remain underneath the surface of the water to eliminate the need for auxiliary sinkers attached to the line or alternately this weight may be entirely eliminated. An intermediate portion 14 extends from the line attaching portion 10 in a general downward curving shape to present a convex forward surface. This intermediate portion 14 is also made of generally V-shaped cross section beginning with a very shallow V adjacent the portion 10 which becomes deeper as the portion extends to the curved end 14' thereof with the point of the V extending in a forward direction which is best seen in Figures 3 and 5. Extending rearwardly from the intermediate portion 14 is a tail portion 16 of V-shaped cross section having a depth approximately the same throughout its extent and of the same angle as presented at the end 14', as seen in Figure 4. This tail portion 16 is also provided with a gentle taper as seen in Figures 2 and 7 and has at the extreme end thereof a hole 17 through which a hook attaching ring 18 is passed, the ring 18 supporting a hook 19 having a plurality of barbs 20.

Referring to Figure 2, it will be seen that the hole 11 for receiving the line attaching ring 12 is affixed centrally of the lure body along with the hole 17 for receiving the ring 18 for attaching the hook 19. Additionally, it will be noted that the line is attached above the center of gravity of the lure, which falls near reference numeral 14' on the drawing. The lure, therefore, as it is drawn through the water, which as viewed from the drawing would be toward the left, would have a pressure exerted against the intermediate portion 14. The water may be considered as impinging first on face 15 of the intermediate portion 14 and alternately on face 15'. This is caused partially by the trolling action imparted to the lure by the fisherman and partially by the weight of the line attached to portion 10, which will normally assume a downward curve as it leads away from the lure. The line being in this attitude will tend to longitudinally pivot the lure about its center of gravity and coupled with the fisherman's action will unbalance the lure and result in a rocking action as taken along the longitudinal axis of the lure which will be continued as long as the lure is dragged through the water. The slightly convex shape of the forward edge of the intermediate portion 14 aids in this rocking motion in which the upper portion thereof nearer the portion 10 will tend to have more pressure exerted thereon than the lower portion toward the tail, which tends to flare away along the faces 16', 16'' of the tail portion.

I claim:

1. A fishing lure comprising a line attaching portion, an intermediate portion, and a tail portion, said line attaching portion and tail portion lying in spaced substantially parallel planes and being interconnected by a sloping intermediate portion, said intermediate and tail portions having a V-shaped cross section, means to attach a hook to said tail portion, said V-shaped cross section progressively increasing in depth from adjacent the line attaching portion to substantially the location of the junction of the intermediate and tail portions, and means affixed centrally of said line attaching portion for attachment of a line.

2. A fishing lure as in claim 1 wherein said line attaching portion is provided with additional mass to weight said lure.

3. A fishing lure as in claim 1 wherein said tail portion is of gently tapering shape from said intermediate portion.

4. A fishing lure as in claim 1 wherein the intermediate portion presents a convex surface at the forward face thereof.

References Cited in the file of this patent

UNITED STATES PATENTS

| | | |
|---|---|---|
| 1,928,367 | Buddle | Sept. 26, 1933 |
| 2,184,031 | Wyatt | Dec. 19, 1939 |
| 2,449,692 | Eichendorff | Sept. 21, 1948 |